UNITED STATES PATENT OFFICE.

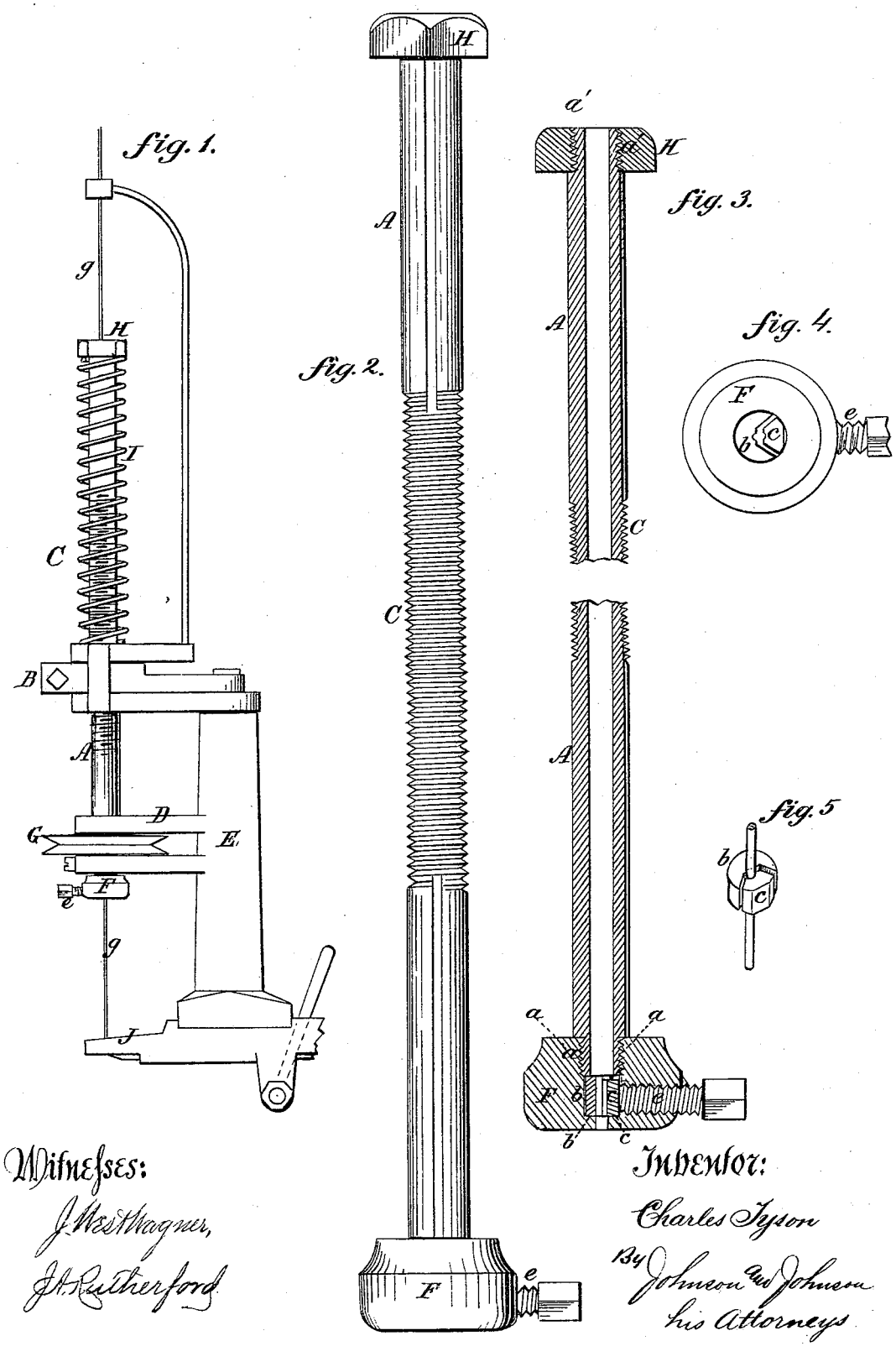

CHARLES TYSON, OF PHILADELPHIA, PENNSYLVANIA, ASSIGNOR TO JOHN MUNDELL, OF SAME PLACE.

IMPROVEMENT IN MACHINES FOR SCREWING THE UPPERS ONTO THE SOLES AND HEELS OF BOOTS, &c.

Specification forming part of Letters Patent No. 149,009, dated March 24, 1874; application filed September 23, 1873.

CASE C.

*To all whom it may concern:*

Be it known that I, CHARLES TYSON, of the city and county of Philadelphia, in the State of Pennsylvania, have invented a new and useful Improvement in Machines for Screwing the Uppers onto the Soles and Heels of Boots and Shoes, and for uniting the ends of belts, hose, &c., of which the following is a specification:

The improvements claimed herein relate to machines for uniting with the uppers the soles and heels of boots and shoes and other articles by screws, and in which the wire to make the screws is threaded and entered, one screw after another, from the same wire, and each entered screw is riveted in the material and cut off, as in the patented machine of Amasa B. Howe, assignee of Eugene Lemercier, administrator of Louis Jules Sellier, of date December 16, 1862; and the improvements which I have made in such machine consists of a reversible screwing-spindle, in which the wire is clamped and carried during the operation of forming the screw, entering and riveting it, the especial object and advantage whereof is to obtain a spindle which may be made of iron tubing, instead of a steel bar, which must have its guide for the wire formed by the expensive operation of boring, and by which the screwing-spindle may be reversed, end for end, for use with a separate clamp-head, whereby the driving-spindle is rendered uniform in its wear, and consequently made to wear longer, and being easily replaced when worn out, and at an expense far less than the steel screwing-spindle hitherto used.

In the accompanying drawings, Figure 1 represents a side elevation of so much of a complete machine as embraces my improvement. Fig. 2 represents the screwing-spindle in elevation, full size; Fig. 3, a vertical section; Fig. 4, a top view of the detachable clamp-head of said spindle; and Fig. 5, view in perspective of the removable clamp, by which the wire is held in the spindle.

The wire-guide or screwing-spindle A is mounted for operation, and has the same movements in the formation of and in driving and clinching the successive screws from the same wire $g$, as described in the patent referred to, and a description of the manner of carrying out these things, and of clamping and releasing the bisected nut B, which works upon the screw-thread C of the spindle A, is deemed unnecessary in this patent, further than to state that the mandrel has a revolving and axial movement, and carries the wire $g$, upon which the screw is cut by a chaser, in a continuous manner, and while being so cut is screwed into the material to be united and riveted at its inner end, and immediately thereafter the wire is cut from the inserted screw by a knife, the material being supported upon a beak-iron during the operation, and which metallic beak-support effects the clinching of the screw when screwed home, while the work is held fast by means of a pressing-nose, J, which can be elevated and depressed as required in relation to the metallic support, as in passing from the heel to the shank of the shoe; and the axial movement of the spindle is effected by the bisected nut. The spindle A is formed of a piece of pipe for the wire-guide, and is turned off at its opposite ends for some distance to present a smooth surface for its axial movement within the driving-pulley, and supporting guide D of the standard E of the pressing-nose. Both ends of this spindle are provided with screw threads $a$ $a'$, and a clamp-head, F, having a female screw, is screwed upon one end thereof. The screw-socket of this clamp-head is of greater depth than the screw-thread thereof, to form a seat and holder for a clamp for the wire. This clamp is made in two sections, $b$ and $c$, the section $b$ being longer than the other, and upon it the screw end of the spindle fits and clamps it firmly upon its seat, so that it cannot turn. The section $c$, while fitting within the recessed portion of the section $b$, is smaller than the recess, and is adjustable, like a follower, by a screw, $e$, passing into the side of the clamp-head.

The central surfaces of these sections have semi-cylindrical cavities, through which the wire $g$ in the spindle passes, and by which it is clamped and held by the screw *e* during the operation of forming the screw and screwing it into the material. These clamp-sections *b c* are of steel or hardened metal, and are easily removed and replaced by new ones when worn out. The object of this construction is to allow the several parts to be replaced separately— that is, the spindle A, clamp-head F, and the clamping-sections *b c*, as it has been found in practice that these parts wear unequally so as to produce an oblong opening, which causes the wire to rotate eccentrically under the operation of forming the screw and screwing it into the material, which is a great disadvantage. Under the operation of the machine, the screw C of the spindle also wears out, or, rather, the acting side of the thread, and it is, therefore, difficult to recut the thread, as the spindle must be greatly reduced. It is to obviate this difficulty and expense that I make the screwing-spindle reversible, and being of common piping it is greatly cheaper than the bored steel spindle.

To reverse the spindle, it is only necessary to remove it from its supporting-arms and reverse it end for end, removing the clamping-head F from one end, and affixing it to the screw of the other end, thereby renewing the spindle by presenting the unworn surface of the thread for operation in the bisected nut B, by which the thread is worn parallel and the spindle made to last a much longer time. If found necessary, the bisected nut B may also be made reversible; but as in practice this nut is renewed generally once a month, at such renewal all the advantages of the reversible spindle are obtained in that way.

The spindle may be driven by hand or power. When the latter case, it is by a pulley, G, having a feather fitting into a groove in the spindle, so as to allow it to feed down the screw while being rotated by the pulley G; but as this feature is fully described in another patent of even date herewith, in connection with the application of steam-power to the spindle, it need not be described herein.

The screw-nut H at the upper end of the spindle serves to keep in place the spring I, by which the spindle is raised to project out the wire for the screws from time to time, and in reversing the spindle this nut H and the spring I is also reversed in proper position.

The operation of the machine in its several successive steps is the same as described in the patent aforesaid.

Having described my invention, I claim—

1. In machines for screwing the uppers onto the soles and heels of boots and shoes, a reversible screwing-spindle, A, for the wire *g*, essentially as and for the purposes described.

2. In combination with a screwing-spindle, A, a renewable and independent clamp-head, F, for the wire, essentially as described, and for the purpose shown.

3. In combination with a reversible screwing-spindle, A, substantially such as described, a reversible clamp-head, F, for the wire, substantially as described.

4. In combination with a reversible spindle, A, and a reversible clamp-head, F, the clamping-sections *b c*, arranged in the socket of the clamp-head, as described.

5. The section *b* of the clamp-head F, clamped in its holding-socket by means of the end of the spindle A, in combination with the adjustable section *c* and clamp-screw *e*, as and for the purpose described.

In testimony whereof I have hereunto set my hand this 23d day of August, A. D. 1873.

CHARLES TYSON.

Witnesses:
A. E. H. JOHNSON,
J. W. HAMILTON JOHNSON.